(12) United States Patent
Zizelman et al.

(10) Patent No.: US 7,470,477 B2
(45) Date of Patent: Dec. 30, 2008

(54) CASCADED FUEL CELL STACKS FOR FAST START-UP AND ANODE COKING CONTROL

(75) Inventors: James Zizelman, Honeoye Falls, NY (US); Jean J. Botti, Rochester Hills, MI (US); John G. Noetzel, Fairport, NY (US); Subhasish Mukerjee, Rochester, NY (US); Kaushik Rajashekara, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 836 days.

(21) Appl. No.: 10/640,743

(22) Filed: Aug. 14, 2003

(65) Prior Publication Data
US 2005/0037249 A1    Feb. 17, 2005

(51) Int. Cl.
  *H01M 8/00*    (2006.01)
(52) U.S. Cl. .............................. 429/12; 429/26; 429/32; 429/46
(58) Field of Classification Search .............. 429/12–46
  See application file for complete search history.

(56) References Cited

U.S. PATENT DOCUMENTS 6,030,718 A * 2/2000 Fuglevand et al. ............ 429/26
6,294,278 B1   9/2001 Wohr et al.
6,794,068 B2 * 9/2004 Rapaport et al. ............... 429/13
2002/0187357 A1 12/2002 Nakamura et al.
2004/0048123 A1 * 3/2004 Kelly et al. .................... 429/26

FOREIGN PATENT DOCUMENTS

JP    2004/171881    6/2004

OTHER PUBLICATIONS

European Search Report dated Mar. 22, 2007.

* cited by examiner

*Primary Examiner*—Jane Rhee
(74) *Attorney, Agent, or Firm*—Paul L. Marshall

(57) ABSTRACT

A solid-oxide fuel cell system having a relatively large primary fuel cell sub-assembly for steady-state operation and a relatively small secondary fuel cell sub-assembly which is rapidly heatable to a threshold operating temperature to a) produce usable power in a short time period, b) cascade a hot exhaust into the primary fuel cell sub-assembly to assist in preheating thereof, and c) provide steam into the primary fuel cell sub-assembly to prevent coking of the anodes thereof. As the primary sub-assembly reaches its threshold temperature, it too begins to generate electricity and continues to self-heat and to be heated by the secondary sub-assembly. Preferably, the secondary sub-assembly continues to provide electricity in complement with the primary sub-assembly until the primary sub-assembly reaches full power, at which time the secondary sub-assembly may be shut down or switched to standby status for fuel efficiency, as desired.

25 Claims, 1 Drawing Sheet

US 7,470,477 B2

CASCADED FUEL CELL STACKS FOR FAST START-UP AND ANODE COKING CONTROL

STATEMENT REGARDING FEDERALLY SPONSERED RESEARCH OR DEVELOPMENT

This invention was made with United States Government support under Government Contract No. DE-FC26-02NT41246. The Government has certain rights in the invention.

TECHNICAL FIELD

The present invention relates to hydrogen/oxygen fuel cells having a solid-oxide electrolytic layer with an anode layer and a cathode layer; more particularly, to assemblies comprising a plurality of such individual fuel cells in a stack wherein it is desirable to prevent coking of the anodes from incomplete reformate fuel combustion during a start-up period; and most particularly, to a fuel cell system including a primary fuel cell sub-assembly for steady-state operation at full required power and a smaller-mass secondary fuel cell sub-assembly having an exhaust coupled to the inlet of the primary sub-assembly to assist in heating the primary sub-assembly to shorten its period of latency and to produce steam to prevent coking of the cold primary fuel cell anodes.

BACKGROUND OF THE INVENTION

Fuel cells which generate electric current by controllably combining elemental hydrogen and oxygen are well known. One form of a fuel cell consists of an anodic layer, a cathodic layer, and a dense ion conducting electrolyte formed of a ceramic solid oxide. Such a fuel cell is known in the art as a "solid-oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ ions catalytically by the cathode. The oxygen ions are conducted through the electrolyte and combine at the anode/electrolyte interface with hydrogen ions to form molecules of water. The anode and the cathode are connected externally through the load to complete the circuit whereby electrons are transferred from the anode to the cathode. When hydrogen for the fuel cell is derived by "reforming" hydrocarbons such as gasoline in the presence of limited oxygen, the "reformate" gas includes CO which is converted to $CO_2$ at the anode. Reformed gasoline and diesel oil are commonly used fuels in automotive fuel cell applications. However, other hydrogen-containing fuels for the reforming process such as, for example, JP8, natural gas, propane, synfuels, alkane alcohols, and coal based fuels may be used as well.

A single cell is capable of generating a relatively small voltage and wattage, typically between about 0.5 volt and about 1.0 volt, depending upon load, and less than about 2 watts per $cm^2$ of cell surface. Therefore, in practice it is known to stack together, in electrical series, a plurality of cells. The outermost interconnects of the stack define electric terminals, or "current collectors," which may be connected across a load. A typical prior art SOFC for use as an auxiliary power unit (APU) in a vehicle may comprise about 60 individual fuel cells and may generate, at full power, on the order of 5 kilowatts of electric power.

A complete SOFC system typically includes auxiliary sub-systems for, among other requirements, generating fuel by reforming hydrocarbons as discussed above; tempering the reformate fuel and air entering the stack; providing air to the hydrocarbon reformer; providing air to the cathodes for reaction with hydrogen in the fuel cell stack; and providing air for cooling the fuel cell stack.

A known shortcoming of a complete SOFC system is that it inherently has a relatively large thermal mass, and consequently, such a system is relatively slow in ramping up to full electric output. Electric output can't begin until the fuel cells are warmed to about 550° C., and a temperature of about 750° C. is required for full output and steady-state operation. The mass of the fuel cell stack along with the induced thermal stresses caused by heating the stack through heated air applied to the cathode dictate the length of time required to produce electricity. Even with known methods for preheating and forced heating of elements in an SOFC system, a prior art SOFC system requires on the order of sixty minutes, starting from ambient temperature, to begin producing usable amounts of electricity. Thus, costly and bulky additional energy storage systems would be required on an APU-powered vehicle to provide power during the fuel cell warm-up period, which causes dissatisfaction to users of such systems. In addition, long start-up times result in a reduction in operating efficiency, especially for intermittent, short-duration operation.

During these start-up periods, unwanted reactions of reformate fuel in the stack is possible, causing deposition of soot (coke) on the relatively cool anode surfaces. Such deposition is undesirable and can result in degradation and eventual failure of the fuel cell stack.

Steam is a known preventor of carbon (coke soot) forming reactions and a known cleaner of soot from anodes. Therefore, the anodes may be cleaned and prevented from coking by injection of hot steam into the fuel cell stack during warm-up to an operating temperature at which coking does not occur. One approach is to produce steam via vaporizing water from a separate water storage tank, and to then inject the steam into the fuel cell stack along with the reformate. Such a process is undesirable since it requires added complexity of apparatus and logic for storing, supplying, vaporizing, and replenishing water adjacent to the fuel cell system.

What is needed is a means for reducing the start-up period required to bring a large solid-oxide fuel cell system to operating temperature.

What is further needed is a means for preventing coke from depositing on the anodes of a solid-oxide fuel cell during the start-up period required to bring the fuel cell system to operating temperature.

What is still further needed is a means for providing hot steam to an SOFC fell cell stack to remove coke which may form on the anodes while the anodes are cool.

It is a principal object of the present invention to reduce the start-up time required for a solid oxide fuel cell system to begin producing electricity.

It is a further object of the invention to reduce the need for electrical storage systems in applications wherein a solid oxide fuel cell is an auxiliary electric power unit.

It is a still further object of the present invention to minimize coking of anodes during the start-up period required to bring a fuel cell system to operating temperature.

It is a still further object of the invention to remove coke deposits that have accumulated on the SOFC anodes.

BRIEF DESCRIPTION OF THE INVENTION

Briefly described, a solid-oxide fuel cell system in accordance with the invention comprises a primary fuel cell sub-assembly for steady-state operation at full required power and a smaller-mass secondary fuel cell sub-assembly which is rapidly heatable to the threshold operating temperature to a) produce usable power in a short time period after start-up of the system and b) cascade a hot, preferably steamy, exhaust into the primary fuel cell sub-assembly to assist in preheating thereof and to prevent coking of the anodes thereof during such preheating. Preferably, the secondary sub-assembly is approximately 5-15% of the size and generating capacity of the primary sub-assembly. Because of lesser thermal mass, the secondary sub-assembly is capable of reaching the power threshold of about 550° C. required to begin generating useful amounts of electricity in about two minutes or less when starting from ambient temperature. The secondary sub-assembly continues to self-heat from the heat of the fuel cell reaction, up to the optimum operating temperature of about 750° C. As the primary sub-assembly also reaches the threshold temperature, it too begins to generate electricity and continues to self-heat and be heated by the secondary sub-assembly. Preferably, the secondary sub-assembly continues to provide electricity in complement with the primary sub-assembly until the primary sub-assembly reaches full power, at which time the secondary sub-assembly may be shut down, or be used for the continued powering of other auxiliaries, or be switched to standby status for fuel efficiency, as desired.

Thus the requirement for separate battery storage to meet immediate electrical start-up needs can be reduced to only a few minutes or less of power, rather than about sixty minutes as in the prior art, thus reducing the size, weight, and cost of such battery storage.

BRIEF DESCRIPTION OF THE DRAWINGS

The present invention will now be described, by way of example, with reference to the accompanying drawing, in which.

DESCRIPTION OF THE PREFERRED EMBODIMENTS

Figure 1:
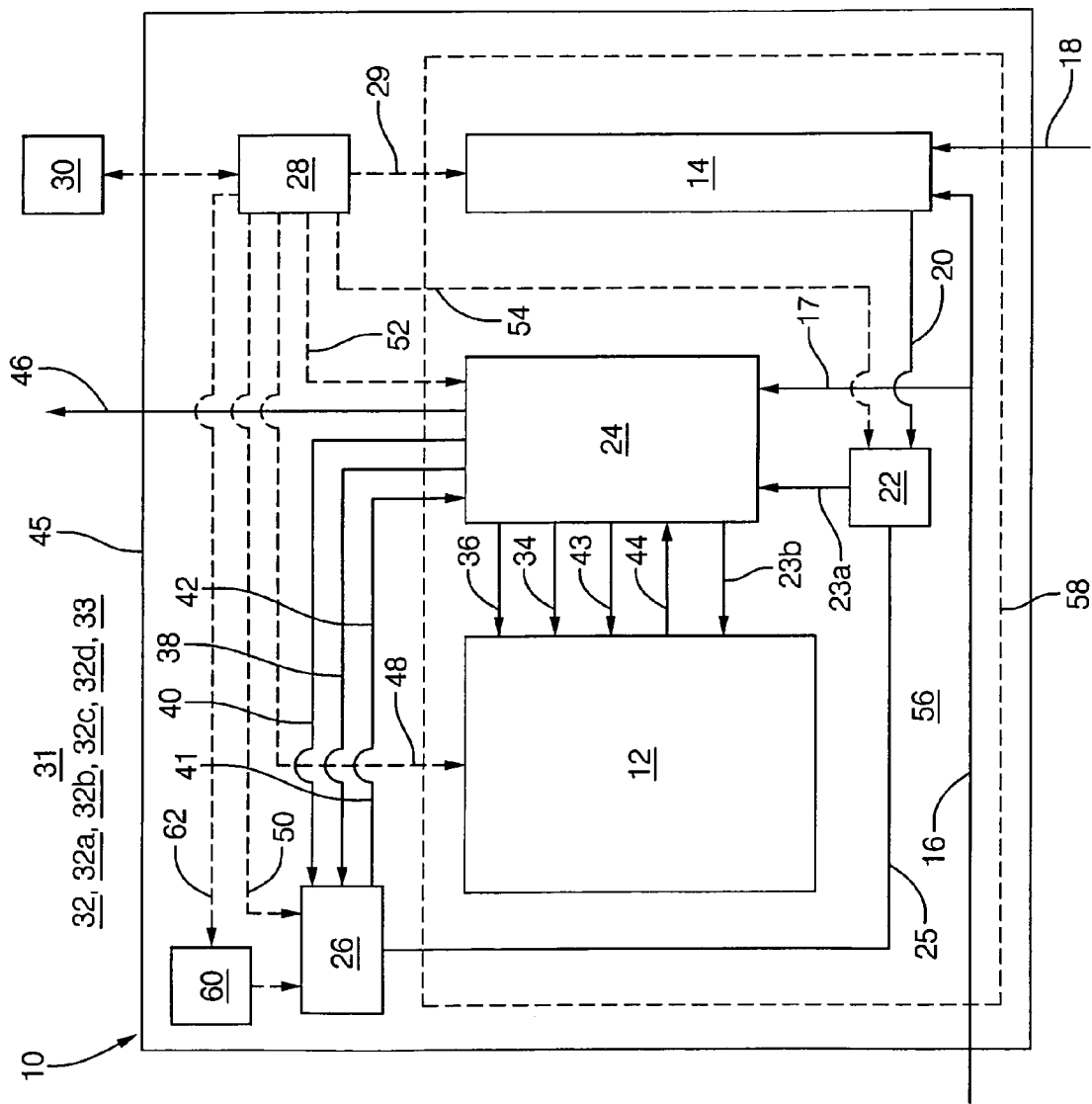
FIG. 1 is a schematic view of a cascade-stack solid-oxide fuel cell assembly in accordance with the invention.

Referring to FIG. 1, a solid-oxide fuel cell system 10 of the present invention includes a main or primary fuel cell sub-assembly 12 having a plurality of individual fuel cells (not shown) stacked in known fashion to produce conjointly a predetermined power output, preferably about 5 kilowatts.

Such a sub-assembly is suitable for use, for example, as a stationary auxiliary electric power source 33 and also as an auxiliary power unit 31 for a vehicle 32 which is motivated by another source of power. The sub-assembly used in a vehicle may or may not be fueled by the same type of fuel as the motivating engine. The type of vehicle may include, but is not limited to, all manner of land vehicles 32a such as automobiles, trucks, and military weapons 32b such as tanks and personnel carriers; all manner of aquatic vehicles 32c such as ships, boats, and submarines; and all manner of aeronautic vehicles 32d such as aircraft and space craft.

Referring again to FIG. 1, a known hydrocarbon catalytic reformer 14 is supplied in known fashion with process air 16 and a hydrocarbon fuel 18, as for example gasoline, to generate a heated reformate stream 20 comprising principally hydrogen, carbon monoxide, and nitrogen. Alternatively, hydrocarbon fuel 18 may include diesel fuel, JP8, gasoline, natural gas, propane, synfuels, alkane alcohols, coal based fuel, and combinations thereof. Of course it must be understood that, within the scope of the invention, system 10 may be powered directly by hydrogen gas, obviating the need for reformer 14. For purposes of the present discussion, however, a reformer and reformate are included as representing a currently preferred embodiment.

Reformate stream 20 may be conveyed by three-way valve 22 to primary sub-assembly 12 via line 23a, integrated multifunctional manifold sub-assembly 24, and line 23b, or via line 25 to a small, secondary fuel cell sub-assembly 26, or to both, as directed by a programmable electronic system controller 28 (ESC) via link 29. Secondary sub-assembly 26 has preferably less than one-fifth the size and capacity of primary sub-assembly 12. ESC 28 communicates and cooperates with an electronic control module 30 for auxiliary power source 31 of vehicle 32 or for stationary auxiliary electric power source 33.

Process air 16 is also directed via line 17 to manifold 24 which further directs the process air into main sub-assembly 12 as both combustion air 34 and stack cooling air 36, and into secondary sub-assembly 26 as both combustion air 38 and stack cooling 40. Exhaust 42 from secondary sub-assembly 26 is cascaded via manifold 24 and line 43 into primary sub-assembly 12 where it flows preferably through and around the stacks to warm them. Spent exhaust 44 is returned to manifold 24 and exits the APU enclosure 45 via exhaust line 46.

In operation, primary sub-assembly 12 requires significant preheating in known fashion by system elements, not shown in FIG. 1, to achieve a known threshold temperature of about 550° C., at which point electric generation may begin. Without cascade heating assistance in accordance with the invention, such prior art heating may require sixty minutes or more when the initial temperature is ambient, e.g. about 20-30° C.

ESC 28 communicates with primary fuel cell sub-assembly 12 via link 48, with secondary fuel cell sub-assembly 26 via link 50, with manifold 24 via link 52, and with control valve 22 via link 54. Upon start-up of APU 10, hot air heating commences in both primary and secondary fuel cell sub-assemblies 26, 12. Because of its relatively low thermal mass, sub-assembly 26 heats much more rapidly than sub-assembly 12. Temperatures on both sub-assemblies are monitored by ESC 28. As the internal temperature of secondary sub-assembly 26 approaches the threshold of about 550° C., preferably in about two minutes or less, ESC 28 initiates fuel reforming in reformer 14, preferably at a very fuel-lean condition, resulting in a fuel lean reformate which produces a substantially hydrocarbon-free exhaust from secondary sub-assembly 26. Hot reformate, which may exit reformer 14 at about 1000° C., is directed via valve 22 to only secondary sub-assembly 26 where it assists in further heating sub-assembly 26. As the threshold temperature is reached, sub-assembly 26 begins generating electricity and rapidly comes up to the maximum output power. This quantity of power may be sufficient to power all of the auxiliaries in the APU system. The hot exhaust 42 is cascaded from the exit of secondary sub-assembly 26 into the intake of primary sub-assembly 12 via line 43, thereby increasing the heating rate thereof and decreasing the time for primary sub-assembly 12 to also reach the threshold temperature and begin generating electricity. Reformate is then also directed into primary sub-assembly 12.

Preferably, the reformate provided by reformer 14 to secondary sub-assembly 26 during start-up is extremely lean in fuel, producing a hot exhaust enriched in steam. The hot, steamy exhaust is very low in residual hydrocarbons and thus is an excellent warmer of primary sub-assembly 12 without producing coking of the anodes therein. Steam enrichment is defined herein as a higher percentage of steam in the exhaust than is experienced when the reformer and secondary sub-assembly are operated under optimal combustion conditions.

In a currently preferred embodiment, secondary sub-assembly 26 may be switched in known fashion to be electrically separate from primary sub-assembly 12 during the beginning of the start-up phase of operation, and may be connected instead to a separate electrical/electronic resistance load 60, preferably disposed on the outside of thermal management zone 56, which is also connected to ESC 28. When sub-assembly 26 begins to experience an electrical load, it indicates that the threshold temperature therein has been reached and steam along with electricity is being produced. The output of sub-assembly 26 may then be switched to provide electricity to auxiliary power uses as desired or sub-assembly 26 may remain for some time in the steam-producing mode. The output steam 41, having substantially zero hydrocarbon content because of the lean fueling of sub-assembly 26, flows via lines 42 and 43 into primary sub-assembly 12 to reduce the propensity for carbon formation on the anodes thereof while heating sub-assembly 12. The amount of steam is controlled by ESC 28 by varying load 60 (via link 62) imposed on secondary sub-assembly 26, which is directly proportional to the amount of steam produced. Of course, this cycle may be run during each start-up or in any other condition wherein there is a propensity toward incomplete combustion in the secondary fuel cell sub-assembly.

Preferably, the secondary fuel cell sub-assembly is operated in a sub-optimal combustion condition to produce excessive steam whenever the internal temperature of the primary fuel cell is below a first predetermined threshold level, such as at start-up and continuing at least until the primary sub-assembly reaches the threshold electric generating temperature of about 550° C. The sub-optimal combustion condition in the secondary fuel cell sub-assembly is terminated when the internal temperature of the primary fuel cell sub-assembly exceeds a second predetermined threshold level, which may be the threshold temperature or any other temperature up to the steady-state operating temperature of the primary fuel cell sub-assembly.

Within the scope of the invention, secondary sub-assembly 26 may be other than simply a scaled-down version of primary sub-assembly 12 and rather may have a different configuration which may be conducive to faster heating. For example, it may include multiple small cells in series to produce the desired voltage (12 volts with 17 cells) with smaller active area and larger anode and cathode gas flow channels.

Main fuel cell sub-assembly 12, reformer 14, and manifold 24 are preferably all enclosed within thermal management zone 56, generally comprising an insulative thermal shell 58 within APU enclosure 45. For retrofitting a prior art APU, the secondary fuel cell sub-assembly need not require resizing of existing shell 58 but instead may be conveniently mounted external to shell 58 and within APU enclosure 45.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:
1. A fuel cell system for generating electric power, comprising:
   a) a primary fuel cell sub-assembly; and
   b) a secondary fuel cell sub-assembly capable of issuing a heated exhaust,
   said primary and secondary sub-assemblies each acting to combine oxygen with a hydrogen-containing fuel and being arranged in cascade such that said heated exhaust from said secondary fuel cell sub-assembly may be passed through said primary fuel cell sub-assembly to heat said primary sub-assembly, wherein the power output capability of said primary fuel cell sub-assembly is greater than the power output capability of said secondary fuel cell sub-assembly.

2. A fuel cell system in accordance with claim 1 wherein said hydrogen-containing fuel is selected from the group consisting of hydrogen gas, reformed hydrocarbon, and combinations thereof.

3. A fuel cell system in accordance with claim 2 wherein said reformed hydrocarbon is selected from the group consisting of diesel fuel, JP8, gasoline, natural gas, propane, synfuels, alkane alcohols, coal based fuels, and combinations thereof.

4. A fuel cell system in accordance with claim 1 wherein said system is a stationary auxiliary electric power source.

5. A fuel cell system in accordance with claim 1 wherein said system is an auxiliary electric power source disposed in a vehicle.

6. A fuel cell system in accordance with claim 5 wherein said vehicle is selected from the group consisting of land vehicles such as automobiles, trucks, military weapons such as tanks and personnel carriers; aquatic vehicles such as ships, boats, and submarines; and aeronautic vehicles such as aircraft and space craft.

7. A fuel cell system in accordance with claim 1 wherein the size of said secondary fuel cell sub-assembly is less than approximately one-fifth the size of said primary fuel cell sub-assembly.

8. A fuel cell system in accordance with claim 1 wherein the power output capability of said secondary fuel cell sub-assembly is about one kilowatt and the power output capability of said primary fuel cell sub-assembly is about five kilowatts.

9. A fuel cell system in accordance with claim 1 wherein the power output capability of said secondary fuel cell sub-assembly is no less than 20% of the power output capability of said primary fuel cell sub-assembly.

10. A fuel cell system in accordance with claim 1 wherein the power output capability of said secondary fuel cell sub-assembly is less than 20% of the power output capability of said primary fuel cell sub-assembly.

11. A fuel cell system in accordance with claim 1 wherein at least one of said primary and secondary fuel cell sub-assemblies includes a solid-oxide fuel cell.

12. A fuel cell system in accordance with claim 1 further comprising a hydrocarbon reformer for providing fuel to said primary and secondary sub-assemblies.

13. A fuel cell system in accordance with claim 12 wherein said reformer is operable in a fuel-lean state to produce a fuel-lean reformate for sub-optimal combustion in said secondary sub-assembly, whereby the exhaust from said secondary sub-assembly is enriched in steam relative to an optimal-combustion exhaust.

14. A fuel cell system in accordance with claim 1 further comprising a multi-function integrated manifold connected to said primary and secondary sub-assemblies for managing gas flows into and out of said primary and secondary sub-assemblies.

15. An automotive vehicle, comprising a fuel cell system for generating auxiliary power for said vehicle, said system including
    a primary fuel cell sub-assembly, and a secondary fuel cell sub-assembly capable of issuing a heated exhaust, said primary and secondary sub-assemblies being arranged in cascade such that said heated exhaust from said secondary fuel cell sub-assembly may be passed through said primary fuel cell sub-assembly to heat said primary sub-assembly, wherein the power output capability of said primary fuel cell sub-assembly is greater than the power output capability of said secondary fuel cell sub-assembly.

16. A fuel cell system for generating electric power, comprising:
   a) a primary fuel cell sub-assembly having a first thermal mass; and
   b) a secondary fuel cell sub-assembly having a second thermal mass and capable of issuing a heated exhaust,
   said primary and secondary sub-assemblies each acting to combine oxygen with a hydrogen-containing fuel and being arranged in cascade such that said heated exhaust from said secondary fuel cell sub-assembly may be passed through said primary fuel cell sub-assembly to heat said primary sub-assembly, wherein said first thermal mass is greater than said second thermal mass.

17. A fuel cell system in accordance with claim 16 wherein the power output capability of said secondary fuel cell sub-assembly is about one kilowatt and the power output capability of said primary fuel cell sub-assembly is about five kilowatts.

18. A fuel cell system in accordance with claim 16 wherein the power output capability of said secondary fuel cell sub-assembly is no less than 20% of the power output capability of said primary fuel cell sub-assembly.

19. A fuel cell system in accordance with claim 16 wherein the power output capability of said secondary fuel cell sub-assembly is less than 20% of the power output capability of said primary fuel cell sub-assembly.

20. A fuel cell system in accordance with claim 16 further comprising a hydrocarbon reformer for providing fuel to said primary and secondary sub-assemblies.

21. A fuel cell system in accordance with claim 20 wherein said reformer is operable in a fuel-lean state to produce a fuel-lean reformate for sub-optimal combustion in said secondary sub-assembly, whereby the exhaust from said secondary sub-assembly is enriched in steam relative to an optimal-combustion exhaust.

22. A fuel cell system for generating electric power, comprising:
   a) a primary fuel cell sub-assembly; and
   b) a secondary fuel cell sub-assembly capable of issuing a heated exhaust,
   said primary and secondary sub-assemblies each acting to combine oxygen with a hydrogen-containing fuel and being arranged in cascade such that said heated exhaust from said secondary fuel cell sub-assembly may be passed through said primary fuel cell sub-assembly to heat said primary sub-assembly, wherein the size of said primary fuel cell sub-assembly is greater than the size of said secondary fuel cell sub-assembly.

23. A fuel cell system in accordance with claim 22 wherein the size of said secondary fuel cell sub-assembly is less than approximately one-fifth the size of said primary fuel cell sub-assembly.

24. A fuel cell system in accordance with claim 22 further comprising a hydrocarbon reformer for providing fuel to said primary and secondary sub-assemblies.

25. A fuel cell system in accordance with claim 24 wherein said reformer is operable in a fuel-lean state to produce a fuel-lean reformate for sub-optimal combustion in said secondary sub-assembly, whereby the exhaust from said secondary sub-assembly is enriched in steam relative to an optimal-combustion exhaust.

* * * * *